(12) United States Patent
Wu

(10) Patent No.: US 7,058,739 B2
(45) Date of Patent: Jun. 6, 2006

(54) WIRELESS PERIPHERAL INTERFACE WITH UNIVERSAL SERIAL BUS PORT

(75) Inventor: Zong Liang Wu, San Diego, CA (US)

(73) Assignee: Koninklijke Philips Electronic N.V., Eindhoven (NL)

( * ) Notice: Subject to any disclaimer, the term of this patent is extended or adjusted under 35 U.S.C. 154(b) by 49 days.

(21) Appl. No.: 10/498,304

(22) PCT Filed: Dec. 5, 2002

(86) PCT No.: PCT/IB02/05209

§ 371 (c)(1),
(2), (4) Date: Jun. 9, 2004

(87) PCT Pub. No.: WO03/052606

PCT Pub. Date: Jun. 26, 2003

(65) Prior Publication Data

US 2005/0015534 A1     Jan. 20, 2005

(30) Foreign Application Priority Data

Dec. 14, 2001 (EP) .................................. 01204910

(51) Int. Cl.
  *G06F 13/42*  (2006.01)
  *G06F 13/20*  (2006.01)
(52) U.S. Cl. .................. 710/106; 710/313; 710/62
(58) Field of Classification Search ...................... None
  See application file for complete search history.

(56) References Cited

U.S. PATENT DOCUMENTS

| | | | |
|---|---|---|---|
| 5,465,392 A * | 11/1995 | Baptist et al. ............... 370/310 |
| 5,890,015 A * | 3/1999 | Garney et al. ................ 710/62 |
| 6,216,188 B1 | 4/2001 | Endo et al. .................. 710/103 |
| 6,603,744 B1 * | 8/2003 | Mizutani et al. ............ 370/310 |
| 6,633,583 B1 * | 10/2003 | Esterson ..................... 370/466 |
| 6,650,549 B1 * | 11/2003 | Chiao ......................... 361/785 |
| 6,725,302 B1 * | 4/2004 | Benayoun et al. ............ 710/62 |
| 6,744,808 B1 * | 6/2004 | Walley et al. ............... 375/146 |
| 2003/0200372 A1* | 10/2003 | Doragh et al. .............. 710/305 |
| 2005/0144334 A1* | 6/2005 | Hamdi et al. ................ 710/15 |

FOREIGN PATENT DOCUMENTS

| | | |
|---|---|---|
| FR | 2799288 | 4/2001 |
| JP | 156797 A | 6/2001 |
| WO | WO0118662 | 3/2001 |

OTHER PUBLICATIONS

Compaq et al. Universal Serial Bus Specification. Revision 2.0. Apr. 27, 2000.*

* cited by examiner

Primary Examiner—Rehana Perveen
Assistant Examiner—Matthew Spittle
(74) Attorney, Agent, or Firm—Michael E. Belk

(57) ABSTRACT

A bus host designed to manage connection and disconnection of devices to and from a wired hub which includes a transceiver for wireless communication with wireless devices. The hub simulates wired connection in response to reception of a wireless signal from the wireless device.

10 Claims, 1 Drawing Sheet

WIRELESS PERIPHERAL INTERFACE WITH UNIVERSAL SERIAL BUS PORT

Communication bus systems are systems that provide for shared means for communication of data between interconnected devices. Many bus systems are "open" in the sense that the number of devices connected to the bus can be adapted to the needs of the user more or less arbitrarily. In dynamical bus systems the number of actively connected devices can even be changed "on the run", while the system continues operation. Of course, the bus system has to be specifically designed to support such dynamical operation, in order that newly activated devices can start participating in communication and in order that deactivation of devices does not lead to errors.

The realization of dynamical operation has to account for the type of coupling that is used in the communication. Necessarily it is different in "wired" busses and "wireless" busses.

The IrDA bus is an example of a wireless bus. The IrDA bus is an infrared bus for communication between devices. An IrDA system contains a host and peripherals both with an infrared transceiver. The host and the peripherals communicate with the host via infrared signals. In a normal mode (mode 1) the host polls "bound" devices (devices that have an address). By means of polling the host permits different devices to send data in different time slots. The IrDA bus allows dynamical changes to the configuration of the IrDA system. Periodically the host hails as yet unbound devices, by polling a dummy address. If there are no bound devices the host enters a sleep mode (mode 0) in which it does not poll. If an active device detects no hailing signals because the host is in the sleep mode (mode 0) the device sends a wakeup message to the host, which enters the normal mode (mode 1) in response.

The Universal Serial Bus (USB) is an example of a "wired" bus. USB provides wired communication in a system with a host and a number of devices. USB also provides for power supply from the host to the devices, but only to a limited extent. The host is connected to the devices in a tree structure with USB wiring as branches and with hubs at the points where the tree branches out. The USB system is dynamical in the sense that devices and hubs can be switched on and off or connected to the system and disconnected from it at any moment. The host is capable of detecting an active device connected to USB wiring from the resistance connected to the wiring. When the host detects a device, the device is "enumerated": the host records the active connection of the device to the USB wiring and communicates with the device to set up a logic connection. If no device is present, or a device is switched off, the host records that the device connected to the wiring is in suspend mode.

The USB host is designed to supply a limited amount of power supply current to the devices via the USB wiring. The average maximum amount of power supply current that is available for a device depends on the mode of operation of the device: in the suspend mode the maximum amount of current is 0.5 mA, but in the active mode the maximum amount of power supply current is higher. Hubs pass the power supply current from the host to the devices that are connected to the hub. That is, the maximum amount of supply current flowing to the hub depends on the number of devices connected to the hub. In addition the hub is allowed to draw 0.5 mA for its own use.

Amongst others, it is an object of the invention to incorporate a wireless communication bus, like the IrDA bus, into a wired bus system, like the USB bus.

The invention provides for a data communication bus system comprising
 a wired communication bus;
 a host designed to manage connection and disconnection of devices to and from the wired communication bus, the host being arranged for detection of a presence of an active device from an electrical connection to the bus made by an active device,
 a hub connected to the host via the bus, the hub comprising a first wireless transceiver;
 a wirelessly coupled device with a second wireless transceiver for communication with the first transceiver, the hub being arranged to simulate the electrical connection in response to reception of a wireless signal from the wirelessly coupled device. The wired communication bus is for example a USB bus. To the host of this bus it appears as if the devices have normal wired connections to the hub. The fact that the devices are coupled to the system by wireless connection to the host is transparent to the host. Only the hub has to be adapted for wireless communication. The hub may use any protocol, such as the IrDA protocol or Bluetooth etc. to communicate with the devices.

In principle, the hub may be provided with its own power supply. However, it is desirable to supply power to the hub from the host. A typical infrared transceiver requires 5 mA of power supply current. The USB bus is designed to supply such an amount of a current, but only to active devices. If no active device is connected to a wired bus, no more than 0.5 mA should be drawn from the bus. This is insufficient to supply a transceiver with 5 mA.

The system according to the invention has an embodiment wherein power for the operation of the wireless communication is drawn from the wired bus. In order to keep the consumed power supply consistent with the number of active devices the transceiver of the hub is operated intermittently, with a duty cycle that is adapted to the number of active devices. In this way, the hub also simulates the power consumption of a wired system toward the host. In a particular embodiment, the transceiver is switched on continuously only if at least one device has been detected and simulated as an active device to the host.

It should be noted that the current consumed by the hub is adapted so that its average current consumption does not exceed the allowable average power supply current. This does not necessarily mean that the current drawn by the hub is not allowed to exceed the maximum for short intervals. In the USB system for example, the current may exceed the average for short intervals, as long as no excess current is drawn over longer intervals. Generally, the relevant period for determining the average depends on the design of the host. If the host does not allow sufficient current for long enough intervals, it may be desirable to charge up a capacitor in the hub with a relatively low supply current from the host during a longer period and to operate the transceiver of the hub with a relatively high current from the capacitor during a shorter period.

Preferably, a device that wants to become active repeatedly transmits wake-up signals to the hub, with time intervals between transmissions that are not consistently equal to the time interval between the intervals in which the transceiver of the hub is powered.

These and other objects and advantageous aspects of the system and device according to the invention will be described in more detail using the accompanying figures.

Figure 1:
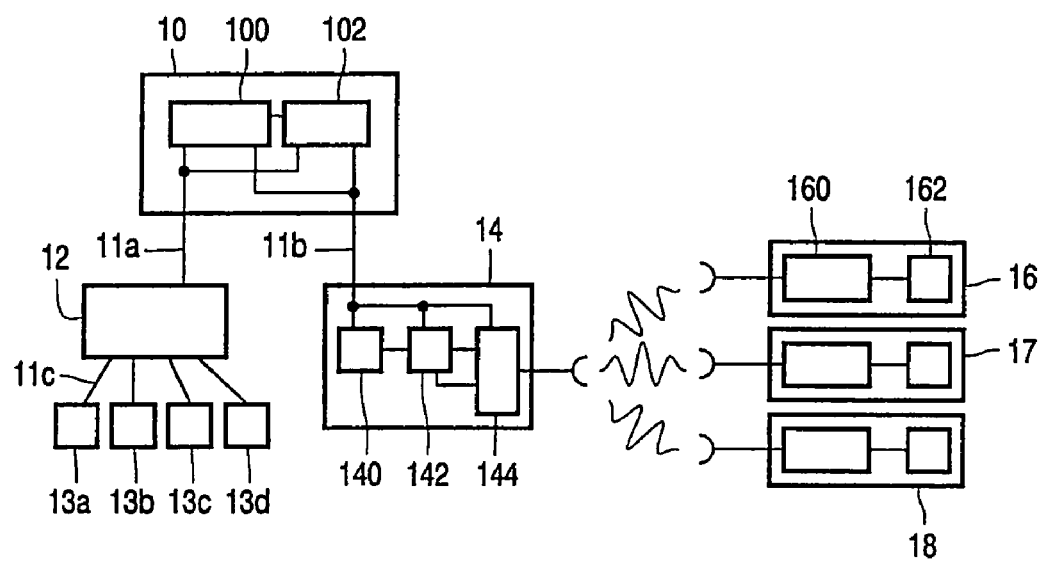
FIG. 1 shows a bus system

FIG. 1 shows a bus system. The system contains a USB host 10, a first and second hub 12, 14, wired USB devices 13a–d, and wirelessly coupled devices 16, 17, 18. The host 10 has wired bus connections 11a,b to the hubs 12, 14. Host 10 contains a controller 100 and a power supply circuit 102 coupled to the wired bus connections 11a,b to the hubs 12, 14. The first hub 12 is a conventional USB hub and has wired bus connections (e.g. 11c) to wired USB devices 13a–d. The second hub 14 contains a controller 142, a bus driver 140 and a transceiver 144, all coupled to the wired bus connection 11b. The wirelessly coupled devices 16, 17 18 contain each a transceiver 160 and a controller 162.

In operation host 10 communicates with devices 13a–d, 16, 17, 18 via hubs 12, 14. Host 10 also supplies power to the wired bus connections 11a,b from power supply circuit 102. When no devices 13a–d, 16, 17, 18 are active power supply circuit 102 supplies a minimum level of power supply current (this is the maximum current that may be drawn by devices in the suspend mode). When controller 100 detects connection of an active device 13a–d, 16, 17, 18 it switches power supply circuit 102 to a state with a higher minimum amount of current that power supply circuit 102 can supply to the bus connection 11a,b to which the active device is coupled.

The part of the communication that occurs between the host 10 and hubs 12, 14 is performed using the conventional USB protocol. The part of the communication that occurs between the first hub 12 and the devices 13a–d connected to it also uses the conventional USB protocol. However the part of the communication that occurs between second hub 14 and wirelessly coupled devices 16, 17, 18 deviates from the USB protocol and uses another protocol, such as the IrDA protocol.

A first mode of operation occurs when hub 14 has not detected any active wirelessly coupled devices 16, 17, 18. In this first mode controller 142 periodically activates transceiver 144 to attempt to receive wake-up signals from the wirelessly coupled devices 16, 17, 18.

Figure 2:
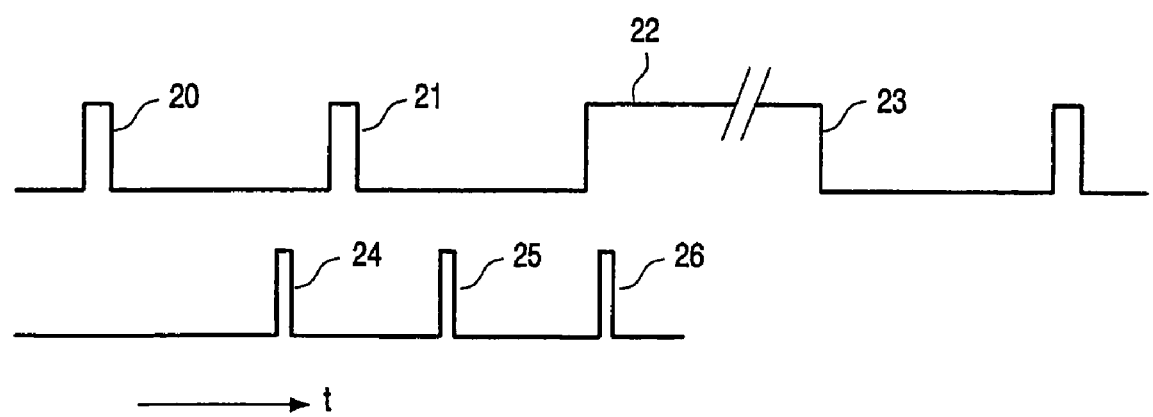
FIG. 2 illustrates operation of the system as a function of time

FIG. 2 illustrates the activation of transceiver 144 as a function of time "t". A first trace shows supply current consumption as a function of time. At periodic intervals the transceiver 144 is activated and consumes power supply current from host 10 via wired bus connection 11b for transmitting a pulse 20, 21 of infrared radiation modulated with information (not shown). Any modulation technique may be used; this technique is not essential to the invention. A second trace shows infrared power transmitted by one or more of the wirelessly coupled devices 16, 17, 18 as a function of time (for part of the time only). When a device 16, 17, 18 wants to start communicating with host 10, the device 16, 17, 18 transmits a wake-up pulse 24, 25, 26 modulated with information to second hub 14. If the device 16, 17, 18 does not receive a response, it repeats the wake-up pulse 24, 25, 26. This continues until the device receives a response.

In FIG. 2 a first and second pulse 24, 25 of modulated infrared power do not coincide with pulses 20, 21 in which transceiver 144 is activated. The first and second pulse therefore do not lead to a response from second hub 14. A third pulse 26 coincides with a period 22 in which tie transceiver 144 draws power supply current. As a result transceiver 144 will detect the wake-up pulse 26. Transceiver 144 reports the wake-up pulse 26 to controller 142. In response controller 142 executes a setup procedure. In the setup procedure controller 142 commands driver 140 to generate signals that simulate electrical connection of a device exactly as if one of the wired devices 13a–d where connected to the second hub 14. As a result, host 10 will raise the power supply current that can be drawn from the bus connection 11b to the second hub 14. With this raised power supply current transceiver 144 can be supplied permanently during an extended period following the start of pulse 22. Accordingly, the first trace of FIG. 2 shows that transceiver 144 may continuously use power supply current for infrared transmission from the start of this period (of course, dependent on the required information exchange with the wireless devices, transceiver 144 may also be switched off again in this period; FIG. 2 shows only the extreme situation that it is permanently on).

After the start of the period 22 in which transceiver 144 receives the wake-up signal, controller 142 sets-up communication with the device 16, 17, 18 that has sent the wake-up signal. This may be done for example using the IrDA protocol, by causing transceiver 144 to send back a hailing signal to the device 16, 17, 18, by enumerating the device and binding it to an address. During this communication the device 16, 17, 18 may also transmit infrared signals (not shown) other that the pulses 24, 25, 26 but this is not shown in FIG. 2 because it is not essential for the invention.

Similarly, host 10 will enumerate the device 16, 17, 18 as a USB device and assign a USB address to the device. Subsequently, host 10 may send a message for the device 16, 17, 18 to the second hub, using the conventional USB protocol. Controller 142 of the second hub receives this message, but instead of passing it to a conventional USB device, controller 142 translates the message to a message for the wireless protocol used for communication with the wirelessly coupled devices 16, 17, 18 and commands transceiver 144 to transmit the translated message. Similarly, wirelessly coupled devices 16, 17, 18 can send back wireless messages (not shown), which second hub 14 receives, translates into USB messages and sends back to host 10.

At some time, wirelessly coupled devices 16, 17, 18 may be deactivated. As each device 16, 17, 18 deactivates, controller 142 causes driver 140 to simulate disconnection of the device to host 10. When all devices 16, 17, 18 have thus been deactivated, power supply unit 102 in host 10 will reduce the available amount of power supply current. Correspondingly, controller 142 of second hub 14 will switch back to the mode in which the transceiver 144 is switched on only intermittently after the end 23 of the period 22.

Although the invention has been shown for a USB bus and an infrared interface, it will be understood that it can be applied as well to other kinds of busses and interfaces.

The invention claimed is:

1. A data communication bus system comprising:
    a wired communication bus;
    a host designed to manage connection and disconnection of devices to and from the wired communication bus, the host being arranged for detection of a presence of an active device from an electrical connection to the bus made by an active device,
    a hub connected to the host via the bus, the hub comprising a first wireless transceiver;
    a wirelessly coupled device with a second wireless transceiver for communication with the first transceiver, the hub being arranged to simulate the electrical connection in response to reception of a wireless signal from the wirelessly coupled device;
    wherein the hub is configured for switching on the first wireless transceiver intermittently; and wherein the second wireless transceiver repeatedly transmits pulses for establishing said communication with the first transceiver, the first wireless transceiver being activated to simulate the electrical connection to the host when one of said pulses occurs when the first wireless transceiver is switched on by the hub.

2. The data communication bus system according to claim 1, wherein the host has an output for power supply current coupled to the bus, the host being arranged to supply up to an average maximum current via the output, the maximum current being dependent on a first count of active devices that the host detects to be coupled to the output, the output being coupled to a power supply input of the first transceiver via the bus, the hub comprising a power management circuit arranged for the switching on the first transceiver intermittently, with a duty cycle adapted to a second count of active devices for which the hub simulates the electrical connections, so that an average current drawn by the first transceiver does not exceed the average maximum supply current corresponding to the second count.

3. The data communication bus system according to claim 2, wherein the hub is arranged to raise the duty cycle up to maximally 100% when it simulates the electrical connection to the host.

4. The data communication system according to claim 2, wherein the host communicates with the hub according to the USB protocol, the hub communicating with the wirelessly coupled device according to a wireless bus protocol, the hub translating messages to and from the wirelessly coupled device so as to simulate to the host that the messages come from and go to a USB device.

5. A hub for use in a data communication bus system with a wired communication bus and a host designed to manage connection and disconnection of devices to and from the wired communication bus, the host being arranged for detection of a presence of an active device from an electrical connection to the bus made by an active device, the hub comprising a first wireless transceiver, the hub being arranged to simulate the electrical connection in response to reception of a wireless signal at the first wireless transceiver from a second wireless transceiver for establishing communication with the first transceiver,
wherein the hub is configured for switching on the first wireless transceiver intermittently; and
wherein the second wireless transceiver repeatedly transmits pulses for establishing said communication with the first transceiver, the first wireless transceiver being activated to simulate the electrical connection to the host when one of said pulses occurs when the first wireless transceiver is switched on by the hub.

6. The hub according to claim 5, comprising a power management circuit arranged to switch on the first transceiver intermittently, with a duty cycle adapted to a count of active devices for which the hub simulates the electrical connections, so that an average current drawn by the transceiver does not exceed an average maximum supply current corresponding to the count.

7. The hub according to claim 6, arranged to raise the duty cycle up to maximally 100% when it simulates the electrical connection to the host.

8. The hub according to claim 6, arranged to communicate with the host according to the USB protocol, the hub communicating with the wirelessly coupled device according to a wireless bus protocol, the hub translating messages to and from the wirelessly coupled device so as to simulate to the host that the messages come from and go to a USB device.

9. A method of communicating between a wired and a wireless communication bus, the method comprising the acts of:
simulating electrical connection of a wired device in response to reception by a first transceiver of a wireless signal from a wirelessly coupled device having a second wireless transceiver for establishing communication with the first transceiver;
switching on the first wireless transceiver intermittently;
repeatedly transmitting pulses by the second wireless transceiver for establishing said communication with the first transceiver; and
activating the first wireless transceiver to simulate the electrical connection when one of said pulses occurs when the first wireless transceiver is switched on.

10. The method according to claim 7, comprising:
supplying up to an average maximum current via the wired bus, the maximum current being dependent on a first count of active devices detected to be electrically coupled to the bus;
switching on a transceiver for communication between the wired bus and the wireless bus intermittently, with a duty cycle adapted to a second count of active devices for which active electrical connections are simulated, so that an average current drawn by the first transceiver does not exceed the average maximum supply current corresponding to the second count.

* * * * *